United States Patent [19]
Hargis

[11] 3,864,810
[45] Feb. 11, 1975

[54] PROCESS AND COMPOSITE LEADLESS CHIP CARRIERS WITH EXTERNAL CONNECTIONS

[75] Inventor: Billy M. Hargis, Cleveland, Ohio

[73] Assignee: Minnesota mining and Manufacturing Company, St. Paul, Minn.

[22] Filed: Sept. 27, 1972

[21] Appl. No.: 292,806

[52] U.S. Cl. ........................ 29/423, 29/412, 29/418, 317/101 CM
[51] Int. Cl. ............................................ B23p 17/00
[58] Field of Search ............................ 29/412–414, 29/418, 423, 583, ; 317/101 CM, 101 CP, 101 A; 264/61; 174/52 S, 68, 5

[56] References Cited

UNITED STATES PATENTS

| | | | |
|---|---|---|---|
| 2,865,082 | 12/1958 | Gates | 29/418 |
| 2,971,138 | 2/1961 | Meisel et al. | 317/101 CP |
| 3,189,978 | 6/1965 | Stetson | 317/101 CM |
| 3,436,605 | 4/1969 | Landron, Jr. | 317/101 A |
| 3,617,817 | 11/1971 | Kawakatsu et al. | 317/101 CM |
| 3,723,176 | 3/1973 | Theobald et al. | 317/101 CM |

*Primary Examiner*—David Smith, Jr.
*Attorney, Agent, or Firm*—Alexander, Sell, Steldt & DeLaHunt

[57] ABSTRACT

A process for producing sets of small ceramic devices such as leadless inverted chip carriers by which the devices are constructed in a base sheet and are separate except for the base sheet during firing. The chip carriers are made to have more readily solderable external connections.

4 Claims, 14 Drawing Figures

PATENTED FEB 11 1975

3,864,810

PROCESS AND COMPOSITE LEADLESS CHIP CARRIERS WITH EXTERNAL CONNECTIONS

This invention relates to a process for producing ceramic devices such as leadless inverted chip carriers which have metallized surfaces and external connections and are composite being made by the firing to maturity of two or more adhered layers on a base sheet. The invention further relates to composite leadless inverted ceramic chip carriers.

Chip carriers are devices for providing small chips with leads which are more conveniently handled than those directly on the chip. After mounting the chip, it is conveniently embedded, for example, by encapsulating means such as covering with a resin such as an epoxy resin. The devices are usually soldered directly to a mother board in considerable numbers and integrity of the solder connections is, of course, imperative. It will be noted that such devices are often inverted when mounted so that the top when the chip is mounted ultimately becomes the bottom. Those heretofore available have been connected solely on the one surface, i.e., the bottom, and the joint was therefore invisible and integrity had to be established on the basis of electrical continuity.

Chip carriers have been available heretofore made by pressing or extruding ceramic powders, coating various surfaces with metallizing and then using various mechanical operations to remove portions of the metallizing to give the desired electrical isolation of parts of the carrier which are not removed. Exemplary of such devices are those of Elliott described in U.S. Pat. No. 3,271,507 and 3,404,214. When it is realized that these carriers tend to be quite small (because of the size of the chips) and are of the order of magnitude of about 1–2 mm. in any direction, it is clear that manual handling of such small items for cutting operations and for mounting the chip is both tedious and difficult. Chip-carriers of this type may be used in vast numbers in certain applications and consequently an improved process as well as improved carriers are needed.

One object of this invention is to provide a new simplified process for the production of ceramic devices. A further object is to provide an improved process for producing inverted chip carriers.

A still further object of this invention is to provide a chip carrier of improved design and particularly one which can be examined visually after mounting to establish that full solder contacts have been made.

Other objects and aims of the invention will become evident from the disclosure and drawings herewith.

In accordance with these and other objects of the invention, a process is provided which permits the production of inverted chip carriers in great numbers at one time with added conveniences during gold-plating operations and chip mounting. The chips are solderable and can be inspected visually for integrity of joints.

The process of the invention depends upon the successive assembly with lamination of a suitably punched and metallized base sheet and two or more structural sheets of green ceramic followed by simultaneous and/or successive removal of portions which are unnecessary and separating into groups of several devices, herein termed sets, and finally firing. Further preparation for commercial purposes usually includes electroplating of exposed metal surfaces with nickel and gold or with other suitable metals. Sets of devices produced by the present invention are especially convenient for electroplating as well as for the mounting of chips and are reduced to individual devices by a rapid grinding operation which removes all vestiges of the base sheet.

Further explanation is given with reference to the drawings provided herewith wherein.

Figures 4, 13:
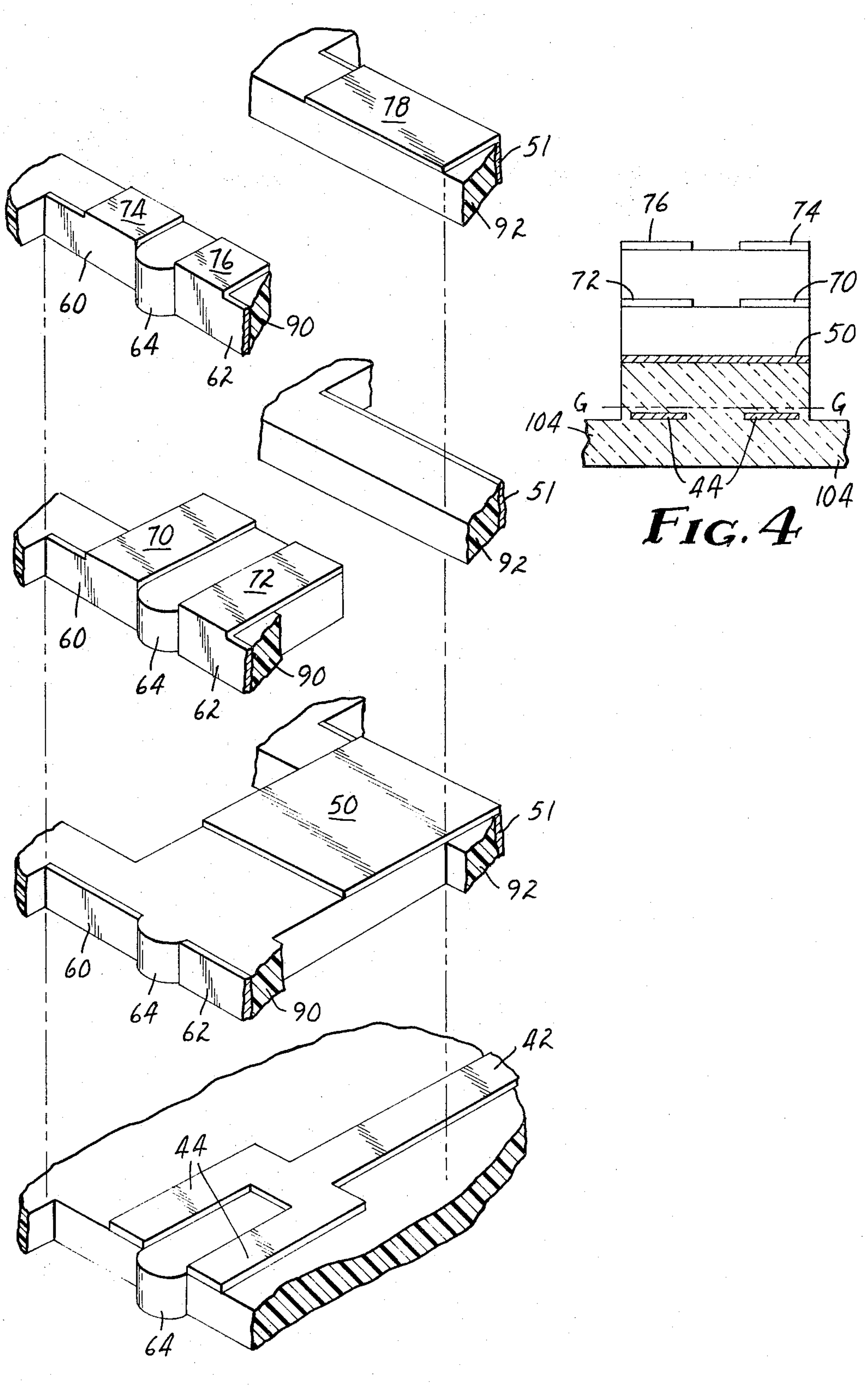
Figure 9:
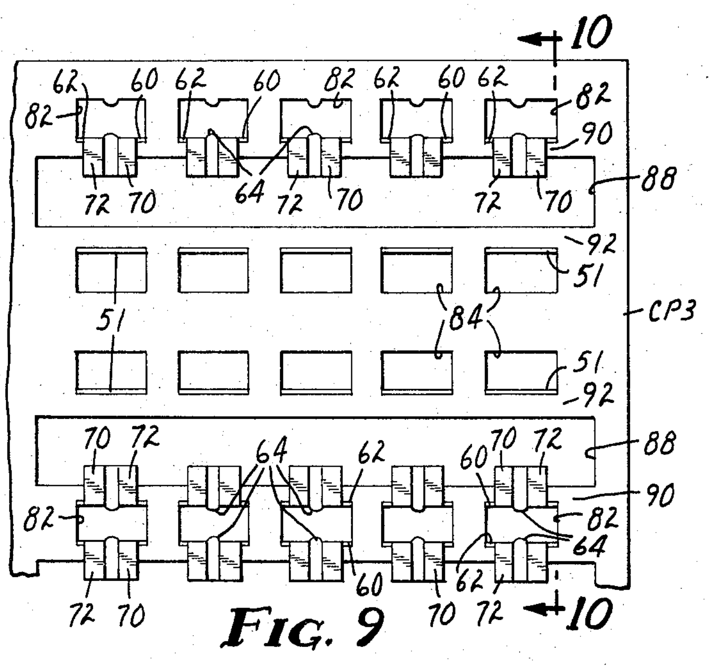
Figure 10:
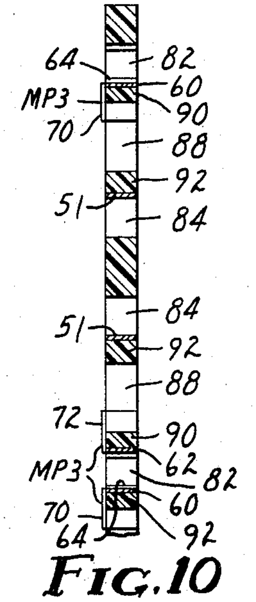
Figure 11:
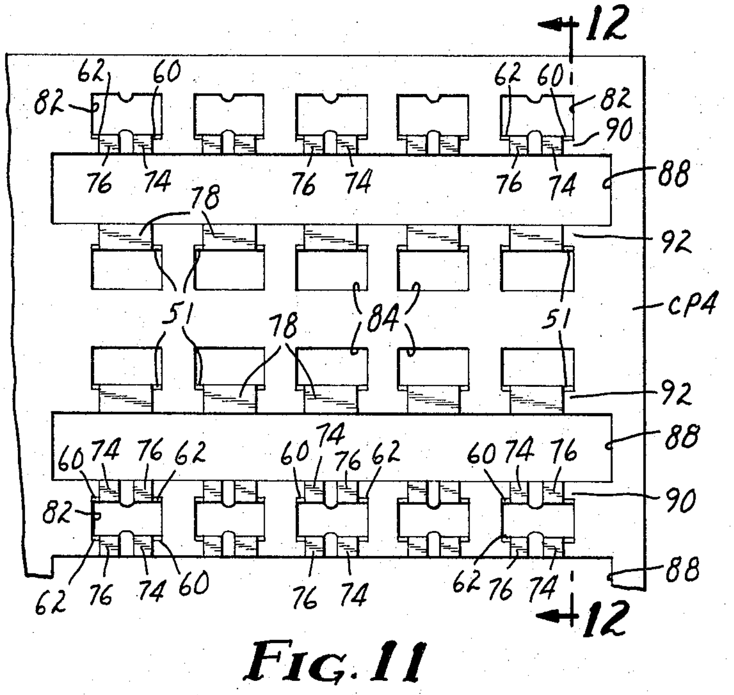
Figure 12:
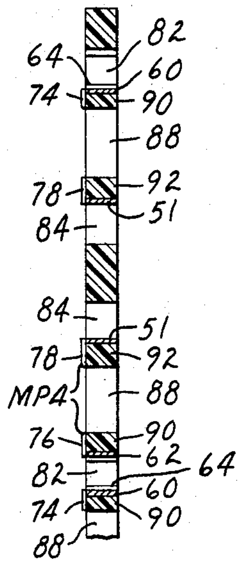

FIG. 4 (sheet 3) is a sidewise cross-section of the fired chip device of FIG. 1, FIGS. 5, 7, 9 and 11 are surface views and 6, 8, 10 and 12 are cross-sectional views as indicated of the green sheets of ceramic planes 1, 2, 3 and 4 respectively each with its metallizing.

FIG. 13 is an exploded assembly showing how the parts of an individual green chip device are related.

Figure 14:
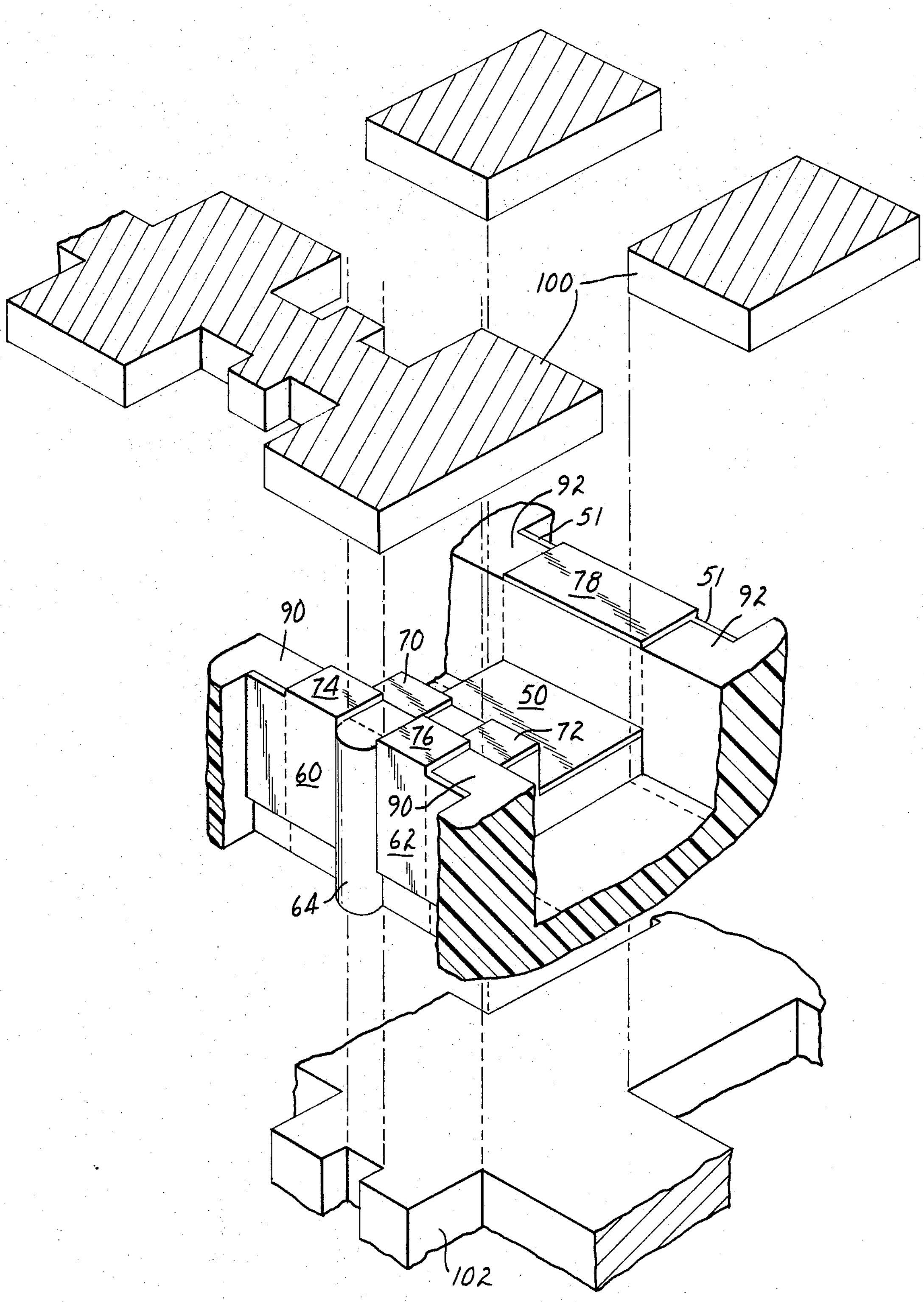

FIG. 14 is a view showing a method for the removal of certain excess materials from the assembled green structure and portions of the green base sheet.

Referring to the drawings, CP1 designates ceramic plane 1, the base plane or sheet, and CP2, CP3 and CP4 designate planes 2, 3 and 4, the structural planes or sheets, respectively, the metallizing on each plane (and on the edges) is designated generically as MP1, MP2, MP3 and MP4 respectively and is most easily seen in the cross-sectional figures. It will be recognized that as shown, the metallizing is somewhat schematic as it is actually very thin and, when the several planes are consolidated or laminated to give a composite, the green ceramic and metallizing accommodate one another so that there is no bulging.

Figures 2, 3:
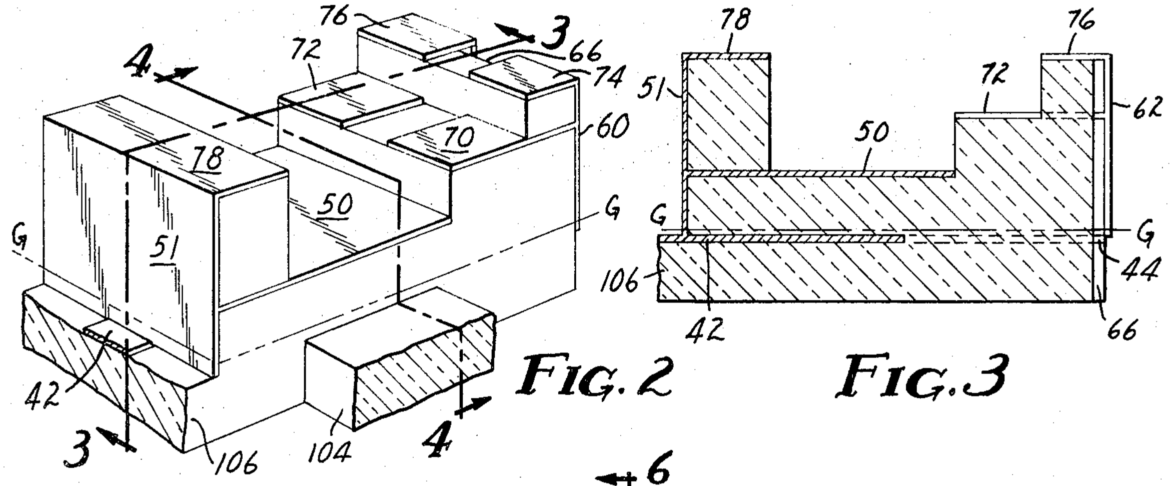
FIG. 2 is a perspective view of a single fired chip device.
FIG. 3, is a longitudinal cross-section.
Figure 5:
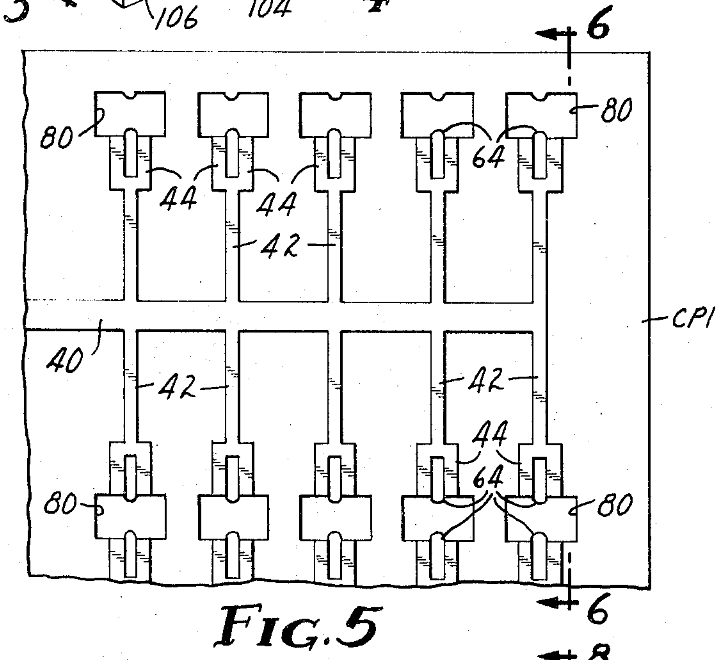
Figure 6:
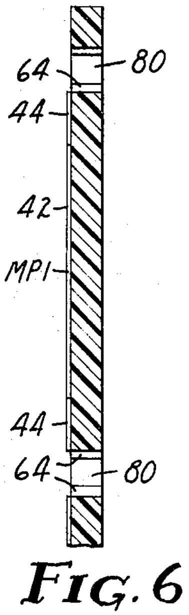
Figure 7:
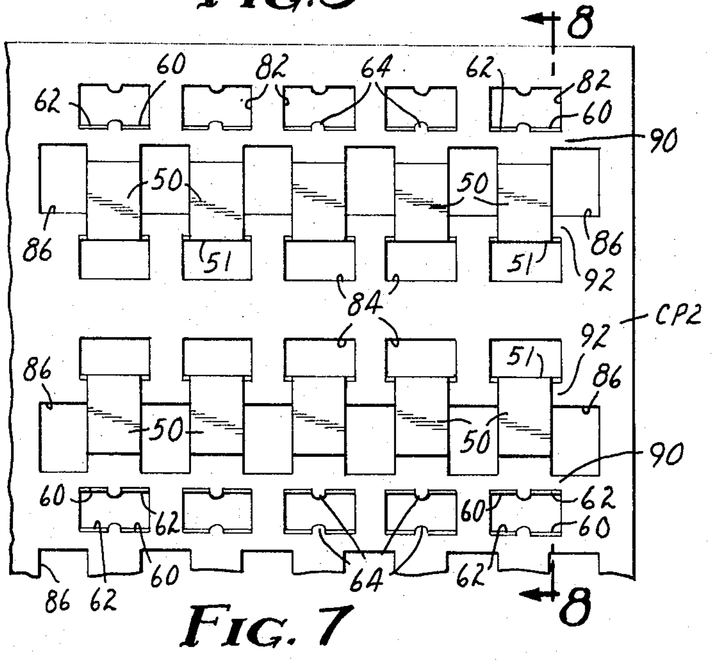
Figure 8:
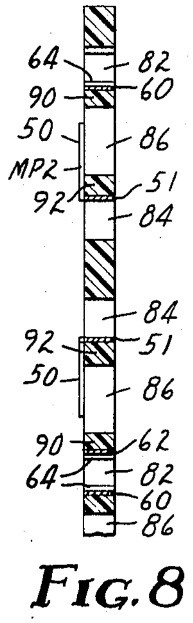

In FIGS. 2, 3 and 4, lines designated GG show the aaproximate level to which the fired ceramic is ground away after goldplating and, usually, after mounting and encapsulating chips. It will be seen that all of CP1 and MP1 are lost in this process. This is the base sheet or plane which serves as a support for construction of the green ceramic devices and for the trunk electrical lead (MP1) subsequently employed during plating operations. It will further be understood that, to an extent, FIGS. 2, 3 and 4 are diagrammatic only as it is not contemplated that single chip carrier devices will normally be separated from sets except by the removal of material to level indicated as GG and then only after mounting and encapsulating chips therein. It is contemplated that individual green devices, by which is meant that part of the total which will eventually make one device such as a chip carrier, will be electrically and ceramically joined together in conjunct groups of about the size of ten units as shown in FIGS. 4, 6, 8 and 10, but larger or smaller such groups are obviously possible from groups of about three or four upward.

Groups of like parts such as this are termed sets. These sets are convenient for firing operations and are fired as such. Sets are further convenient in manipulation of such small devices because a set produced according to the process of the invention is electroplated using a single connection and is more easily handled for the mounting of chips and encapsulation.

Subsequent to mounting the chip, the bottom plane (CP1) is ground away approximately along the lines GG and the individual devices separated. It will be seen that the one step which is used for trimming removes all surplus green material from the green chip carrier so that after removal of the base sheet (CP1 and MP1) the individual chip carrier has straight edges and is ready for mounting on a mother board in the conventional form.

The method employed here of employing a base sheet or support plane and structural sheets or composite planes can be adapted to other designs in which more terminals or other arrangements of connections are desired as will be evident to those skilled in the art. Also variations in the metallizing to economize materials or to achieve greater consolidation of ceramic are within the scope of the invention. Thus, the chip carrier device of FIG. 2 is not fully unified because of the extension of MP2 to the end. Provision could be made as by necking MP2 near the edge so that the ceramic would be unified. Both such ceramic devices are embraced by the term substantially unified inasmuch as the ceramic to metal seals are very strong. Other such modifications will be apparent.

Referring again to the drawings, the green ceramic sheets shown in FIGS. 5, 7, 9 and 11 will be seen to be portions of larger sheets. Because of the small sizes of these pieces which may be of the order of about 1 mm. wide by about 2 mm. long or less, a group, that is a set, as shown in these figures may cover an area less than 2 $cm^2$ and even only approximately 1 $cm^2$. Accordingly, quite a number of such groups can be produced at one time with proper care for registry between layers, etc. as is known to those in the art. The sheet material for each layer is of the order of 0.2 to 0.3 mm. thick and may be made using any of the usual ceramic compositions such as alumina of 90 to 99.9 percent or higher purity, beryllia, or other suitable compositions which may include ingredients conferring color or making the ceramic black or opaque as desired. This invention is not concerned especially with the particular ceramic, but for general utility alumina of about 94 percent or greater purity is preferred.

It will be noted that in FIGS. 6, 8, 10, 12, 13 and 14 the articles are cross-sectioned as plastic or synthetic resin because the material partakes of the properties of the binder employed. In FIGS. 2, 3 and 4 which is intended to show a single device after firing the cross-sectioning represents ceramic because the binder is entirely lost in firing.

Figure 1:
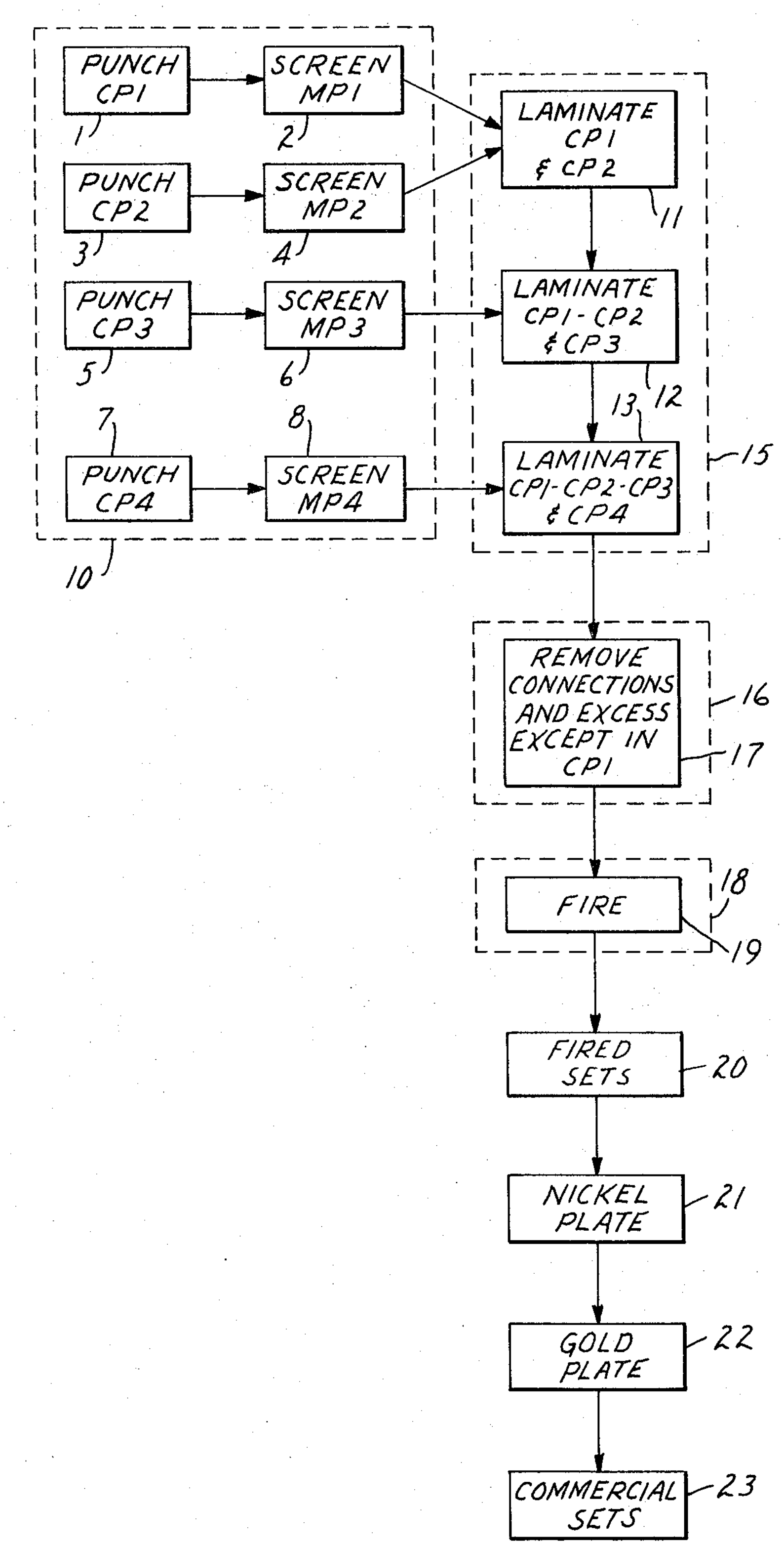
FIG. 1 is a flow sheet showing mechanical and process steps included in practicing the process of the invention.

Reference is now made to FIG. 1 which shows the process of the invention which leads to fired sets by the process of the invention as well as further steps of plating to give sets as usually desired for commerce.

The first step of the invention is to provide a green ceramic base sheet and at least two green ceramic structual sheets each sheet having particular metallizing. It will be seen that the boxes within broken line Box 10 represent this step of the invention, Boxes 1, 3, 5 and 7 are respectively marked "punch" for CP1, CP2, CP3 and CP4 indicating cutting out green sheets from a green ceramic tape as described by Park in U.S. Pat. No. 2,966,719, and making appropriate holes. The sheet for this purpose is desirably rather thin, for example, 0.2 to 0.3 mm. but depending on the structure being made may be less or more. Boxes 2, 4, 6 and 8 are marked "screen" for MP1, MP2, MP3 and MP4 respectively referring to screen printing with metallizing compositions of the respective patterns. The metallizing compositions may be of any type such as molybdenum-manganese, tungsten, platinum, or other metals compatible with the particular ceramic.

Broken line Box 15 includes the second step of the process of the invention in which a multiplicity of connected multilayer devices are constructed on the green base sheet CP1 by successive lamination of the several layers in registry therewith. In Box 11 the first operation is "Laminate" CP2 to CP1, in Box 12, "Laminate" CP1–CP2 with CP3 and in Box 13 "Laminate" CP1–CP2–CP3 with CP4.

The third step of the invention, indicated by broken line Box 16 and Box 17 of the flow diagram of FIG. 1 is to "Remove connections and excess except in CP1." This step is the removing of excess green ceramic material connecting the multilayer green device while substantially retaining edge-metallizing (CP2, CP3 and CP4 especially) and intraconnections of green ceramic of the base sheet (CP1) as well as electrically connecting network of MP1 for each set. The base sheet is described as aperturate.

The fourth step of the process (broken line Box 18) of the invention is to fire the sheet to maturity as indicated by "fire" in Box 19. This provides the "fire sets" indicated in Box 20 which one may "nickel plate" in Box 21 and "gold plate" in Box 22 to provide "commercial sets" in Box 23. Alternative plating schedules will be apparent to those skilled in the art. The plated commercial sets are not shown in the figures as they would only be distinguishable by the plated layers of metal.

The sets are ready after plating for the manufacturer who (1) mounts a chip in each device, (2) wire bonds the chip to the leads in the device and, (3) embeds or encapsulates the chip. At this point, a simple separation of the individual carriers in the set is effected by grinding away the CP1 and MP1 layers as indicated by the line GG in the figures. The chip carrier is now ready to mount on a mother board (inverted position) by reflow soldering.

FIGS. 5, 7, 9 and 11 show portions only, here represented as a corner, of the sheets provided in the first step of the process of the invention for CP1, CP2, CP3 and CP4 respectively. It would be within the scope of the invention to provide only the first three of these sheets or to provide more such pieces depending on the particular design which was sought. It is also within the scope of the invention to employ variations in metallizing in any or all planes to comport with the desired device. Such variations will be readily apparent. As shown, part of the holes are common between adjacent sets but using more material, holes may be provided which are exclusively related to only one device.

The respective cross-sections of those sheets at the designated positions are shown in FIGS. 6, 8, 10 and 12 respectively. In these figures and also in FIGS. 13 and 14 the parts of the final chip carrier device are pad 50 with its connecting edge metallizing 51 which serves in the assembled device to connect to the electrical connecting system 40 of the set through connectors 42 which are divided at the outer end at 44 (all together constituting MP1) to give connections through edge metallizing 60 and 62 (which appear in parts on each of CP2, CP3 and CP4) to inner connections 70 and 72 and top solder pads 74 and 76 each respectively. It will be seen that edge metallizing 51 also extends over CP2, CP3 and CP4 to connect to top solder pad 78. It will be recognized that the pads 74, 76 and 78 are actually bottom pads when the device is inverted for soldering on a mother board. It will be recognized from the above that all parts of each device in each set are interconnected electrically through the connections of MP1. It will be seen that edge metallizings 60 and 62 are separated by a small crenation 64 which is continued throughout the various layers. This serves particularly to maintain the two metallizings separate and is not by any means necessary to the process of the invention although a helpful refinement. Likewise the openings 80 in CP1 are not necessary for the process of the invention and, in fact, are used particularly to provide edges in the finished devices in the other layers where it will be seen that holes 82 are associated with one end, holes 84 with the other end and holes 86 with the sides of the devices. In sheets CP3 and CP4 where a channel must be formed between the ends of the chip carrier device, elongated holes 88 are provided. It will also be seen that small intact portions of CP2, CP3 and CP4 must be maintained to supply continuity of the green ceramic sheets. These small green ceramic connections are designated 90 at one end and 92 at the other end of the device as will be seen in the exploded view of FIG. 13 and in FIG. 14.

The assembled green structures are shown diagrammatically in FIG. 14 being cut out by a male die 100 (which is shown with part of the die cut away) and female die 102 (the bottom of which is also cut away). The dies are shown as being of metal, but it will be recognized that they merely provide a method of removing excess green ceramic material connecting the multilayer green devices and in the base sheet. It will be seen that in addition to removing connections 90 and 92 the crenations 64 are also removed and a slight notch 66 is cut and apertures (not numbered) are cut in the base. This provides a clean separation between the external leads 60 and 62. Bearing in mind that these items may have dimensions of the order of 1 to 2 mm., it will be recognized that the extra precaution for separating 60 and 62 is helpful although not necessary. The further removal of this crenation shown in FIG. 14 makes the distinctness of the two edge metallizings even sharper. The construction lines in FIG. 14 show the relationship of the various structural features.

A fired single device is shown in FIGS. 2, 3 and 4 with the ceramic connection 104 to the adjacent device (or to the outer edge of the set) and connection 106 (bearing connector 42) shown as broken. The parts in this device (which is rotated 180° from the assembly drawings of FIG. 13 and the process step of FIG. 14) are designated by the same indicia as are the corresponding green parts noted hereinabove because it is not considered that the invention would be further clarified by use of different numerals for fired parts and unfired parts. It will be noted that in FIGS. 13 and 14 the several layers are shown as integrally connected at least through the metallizing, that is essentially unified, although the device may be described on occasion as multilayered in recognition of and reference to the method of manufacture. Because the pads to which soldering connections are made (74, 76 and 78) connect directly to the edge metallizing at the ends (60, 62 and 51 respectively) the solder which wets the pad also forms a fillet along the edge which shows visually that soldering has actually occurred.

What is claimed is:

1. A process for the production of ceramic sets of devices such as chip carriers comprising pluralities, of at least about four, of conjunct small multilayer ceramic devices having exterior and interior electrical contacts comprising the steps of:

1. preparing a green ceramic base sheet and at least two green ceramic structural sheets, said base sheet being provided with at least one terminal for each of said ceramic devices and an electrically connecting network between at least all said terminals for each of said ceramic sets, and each structural sheet being provided with
   a. at least one hole having edge metallizing for each of said ceramic devices, and,
   b. at least one metallized pad area for each of said ceramic devices near said hole and further holes laterally adjacent to said pad area, each said pad area being connected to said edge metallizing,
2. erecting a multiplicity of connected multilayer green devices by successive lamination of said green ceramic structural sheets on said green ceramic base sheet in registry to one another so that edge metallizing of successive structural sheets is commonly connected, at least in the same set, to the electrically connecting network of said base sheet,
3. removing green ceramic material connecting said multilayer green devices and superfluous thereto while substantially retaining said edge metallizing and interconnections of green ceramic of said base sheet and at least the electrically connecting network for each said set whereby green sets comprising a plurality of electrically connected multilayer green ceramic devices connected by green ceramic are formed and,
4. firing said green sets to maturity whereby sets of ceramically and electrically connected conjunct small multilayer ceramic devices are obtained in which there is interconnection of all exposed metallic surfaces.

2. The process according to claim 1 wherein there is a pair of holes for each ceramic device which pair has edge metallizing.

3. The process according to claim 2 wherein at least one member of at least part of the pairs of holes in each set is shared as part of a pair for a ceramic device in an adjacent set.

4. The process according to claim 1 wherein each pad area has only one connection to edge metallizing.

* * * * *